(12) United States Patent
Klusemann et al.

(10) Patent No.: US 9,028,015 B2
(45) Date of Patent: May 12, 2015

(54) METHOD FOR OPERATION OF A BRAKING SYSTEM FOR A MOTOR VEHICLE

(75) Inventors: Rainer Klusemann, Frankfurt am Main (DE); Karel Stastny, Frankfurt am Main (DE); Mirco Hinn, Frankfurt am Main (DE); Ronald Kulbe, Gerichshaim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1885 days.

(21) Appl. No.: 11/659,253

(22) PCT Filed: Jul. 26, 2005

(86) PCT No.: PCT/EP2005/053636
§ 371 (c)(1),
(2), (4) Date: Nov. 30, 2007

(87) PCT Pub. No.: WO2006/013174
PCT Pub. Date: Feb. 9, 2006

(65) Prior Publication Data
US 2008/0190718 A1  Aug. 14, 2008

(30) Foreign Application Priority Data

Aug. 2, 2004  (DE) .................. 10 2004 037 621
Feb. 10, 2005  (DE) .................. 10 2005 006 229
Jul. 4, 2005  (DE) .................. 10 2005 031 155

(51) Int. Cl.
*B60T 8/32* (2006.01)
*B60W 10/02* (2006.01)
*B60T 1/12* (2006.01)
*B60T 13/74* (2006.01)

(52) U.S. Cl.
CPC .. *B60T 1/12* (2013.01); *B60T 13/74* (2013.01)

(58) Field of Classification Search
USPC .......... 303/191, 192; 477/182, 189, 190, 191, 477/195, 197; 701/70; 192/13 A, 219, 192/219.1, 219.4, 218
See application file for complete search history.

(56) References Cited

U.S. PATENT DOCUMENTS

| 5,984,429 | A | * | 11/1999 | Nell et al. | .................. | 303/113.4 |
| 6,260,934 | B1 | * | 7/2001 | Lee | .................. | 303/192 |
| 6,287,236 | B1 | * | 9/2001 | Ishikawa | .................. | 477/71 |
| 6,679,810 | B1 | * | 1/2004 | Boll et al. | .................. | 477/195 |
| 7,407,463 | B2 | * | 8/2008 | Kinder | .................. | 477/170 |

(Continued)

FOREIGN PATENT DOCUMENTS

DE  3642874  6/1988
DE  4218717  12/1993

(Continued)

*Primary Examiner* — Vishal Sahni

(57) ABSTRACT

Disclosed is a method for operating an electromechanically operable parking brake for motor vehicles with a driving engine furnished with a mechanical gear box, being substantially composed of an operating element, an electronic control unit, to which are sent wheel rotational speed values from wheel rotational speed sensors, at least one unit for generating a brake application force, and brake devices on at least one axle being lockable by the unit, with the electronic control unit actuating the unit after detection of a starting maneuver of the motor vehicle in the sense of a release operation of the parking brake. In order to render a release operation of the parking brake as comfortable as possible after detection of a starting maneuver of the motor vehicle, the method at issued arranges that the electronic control unit (6) actuates the unit (1) in order to reduce the brake application force to an inclination-responsive holding force when a starting maneuver is detected and before the release operation of the parking brake is performed.

16 Claims, 4 Drawing Sheets

(56) References Cited

U.S. PATENT DOCUMENTS

| | | | |
|---|---|---|---|
| 7,419,455 B2 * | 9/2008 | Hardtle et al. ................. | 477/93 |
| 2006/0076204 A1 | 4/2006 | Kinder | |

FOREIGN PATENT DOCUMENTS

| | | |
|---|---|---|
| DE | 4432456 | 3/1996 |
| DE | 19814657 | 10/1999 |
| DE | 10200783 | 7/2003 |
| GB | 2376990 | 12/2002 |
| JP | 11123957 | 5/1999 |
| JP | 2000177549 | 6/2000 |
| JP | 2004066874 | 3/2004 |
| JP | 2004066993 | 3/2004 |
| JP | 2004142520 | 5/2004 |
| WO | 2004106131 | 12/2004 |

* cited by examiner

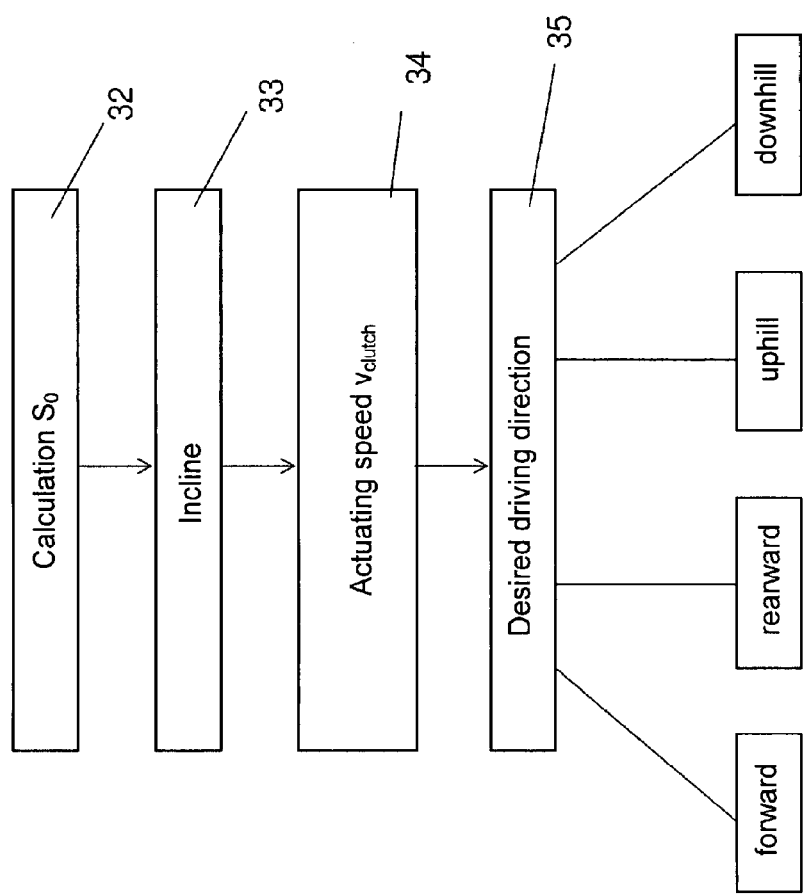

METHOD FOR OPERATION OF A BRAKING SYSTEM FOR A MOTOR VEHICLE

BACKGROUND OF THE INVENTION

The present invention relates to a method for operating an electromechanically operable parking brake for motor vehicles with a driving engine furnished with a mechanical gear box, being substantially composed of an operating element, an electronic control unit, to which are sent wheel rotational speed values from wheel rotational speed sensors, at least one unit for generating a brake application force, and brake devices on at least one axle being lockable by the unit, with the electronic control unit actuating the unit after detection of a starting maneuver of the motor vehicle in the sense of a release operation of the parking brake.

DE 103 24 446 B3 discloses a method for controlling a brake system equipped with an electric parking brake. In the prior art method, a first stretch of time is determined from the beginning of the coupling action until a point of time of response of the clutch, which corresponds to the so-called clutch bite-point. Subsequently, the release time of the electric parking brake is selected to be ahead of the point of time of response of the clutch by a second stretch of time. The prior art method represents an altogether time-responsive control of the parking brake, and its purpose is to allow a more accurate coordination of the deactivation of the electric parking brake with regard to the clutch-engaging operation and, hence, to the starting maneuver of the vehicle. It is, however, taken into consideration only to an insufficient degree that electric parking brakes typically require a relatively long stretch of time to perform a complete release operation. Therefore, it may occur in quick starting maneuvers that the point of time of response of the clutch is already reached and the electric parking brake is not completely released.

In view of the above, an object of the invention is to disclose a method, which reduces the stretch of time for release of the parking brake in order to achieve greater comfort, while maximum safety is maintained in addition.

SUMMARY OF THE INVENTION

According to the method, this object is achieved in that the electronic control unit actuates the unit in order to reduce the brake application force to an inclination-responsive holding force when a starting maneuver is detected and before the release operation of the parking brake is performed.

It is then arranged for that the inclination-responsive holding force is found out with the aid of a sensor for inclination detection.

In a particularly favorable improvement, the electronic control unit actuates the unit in the sense of increasing the brake application force when the calculated and adjusted inclination-responsive holding force or the resulting brake torque is not sufficient to hold the motor vehicle in position. It is arranged in this case that the unit is actuated such that the maximum possible brake application force is generated.

Further, it is arranged for that wheel rotational speed sensors are used to check whether the value of the inclination-responsive holding force is sufficient to hold the motor vehicle in position.

In a particularly favorable improvement of the method of the invention, a clutch pedal travel sensor detects the position of the clutch pedal of the motor vehicle, and the actuation for the release operation takes place when the clutch pedal has reached a position ahead of the clutch bite-point.

It is arranged for that the position is variable and is determined depending on the incline, the actuating speed of the clutch pedal, and the driving direction of the motor vehicle as desired by the driver.

A sensor for inclination detection is used to detect the incline. The actuating speed of the clutch pedal is detected using the clutch pedal travel sensor, while the driving direction of the motor vehicle is detected using a gear information sensor.

BRIEF DESCRIPTION OF THE DRAWINGS

The invention will be explained in detail in the following by way of an embodiment making reference to the accompanying drawings. In the drawings:

FIG. 4 is a flow chart to determine a position ahead of the clutch bite-point depending on the incline, the actuating speed of the clutch pedal, and the desired driving direction of the motor vehicle.

DETAILED DESCRIPTION OF THE DRAWINGS

Figure 1:
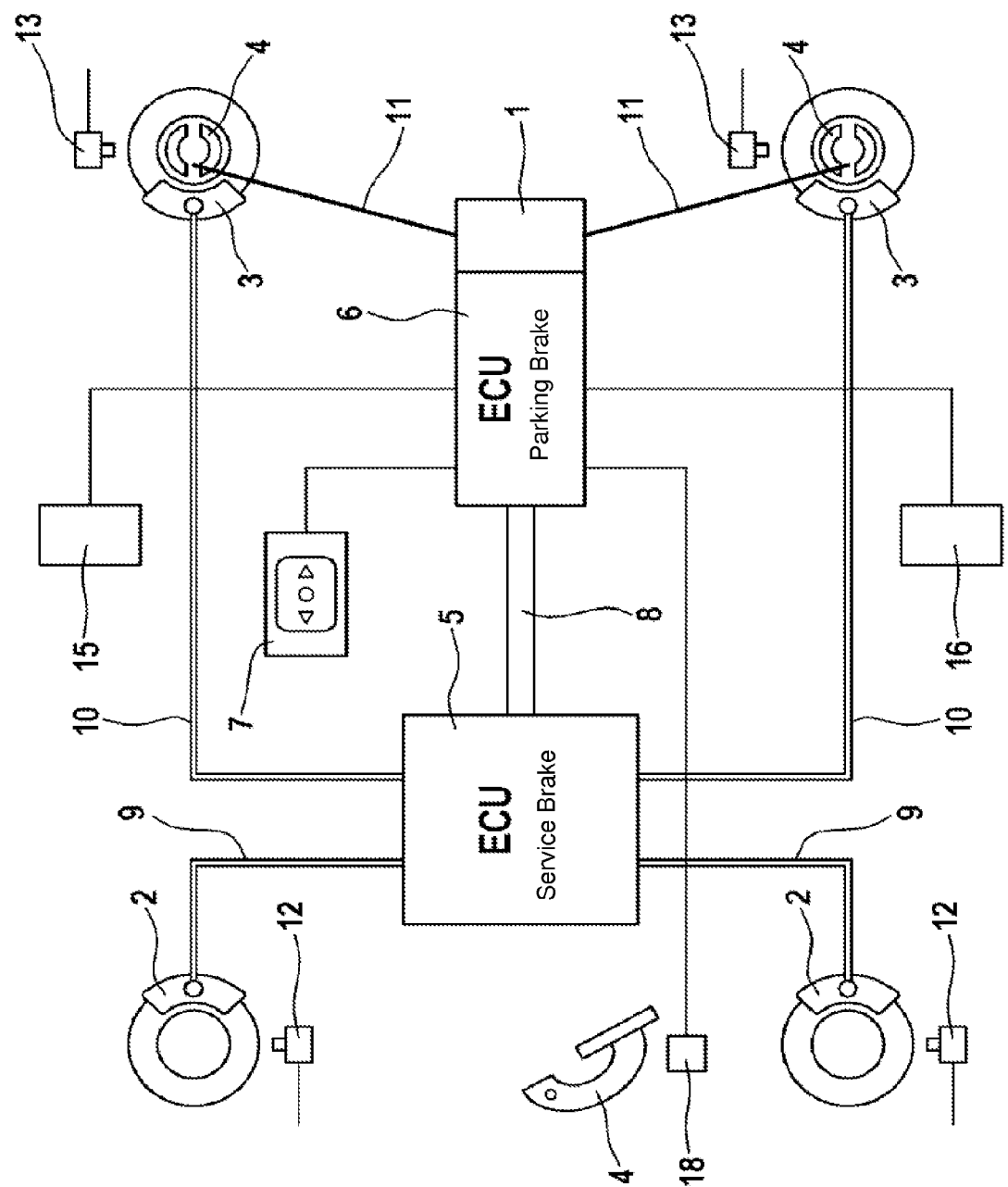
FIG. 1 is a schematic circuit diagram of a hydraulic brake system including an electromechanical unit for executing parking brake operations and on which the method of the invention can be implemented.

A circuit diagram of a hydraulic brake system is represented in FIG. 1. The hydraulic brake system is equipped with wheel brakes 2 on a first axle, the front axle, which can be pressurized by way of a hydraulic line 9 during service brake operations. To check the desired braking deceleration and realize anti-lock control (ABS), wheel rotational speed sensors 12 are associated with the wheels of the front axle whose output signals are sent to an electronic control and regulation unit (ECU) 5. The electronic control and regulation unit 5 is associated with the service brake system. On a second axle, the rear axle, there is also provision of wheel brakes 3 which can be pressurized by way of a second hydraulic line 10 during service brake operations. The rotational speeds of the wheels of the rear axle are determined by using wheel rotational speed sensors 13 and sent to the above-mentioned electronic control and regulation unit 5. Further, the wheels of the rear axle also include an electromechanical parking brake in addition to the wheel brakes 3 for service brake operations. The electromechanical parking brake comprises two mechanically locking brake devices 4, which, in the capacity of drum brakes 4, are designed with each one spreading lock (not shown). The mentioned spreading lock is operable by an electromechanical adjusting unit 1 by means of a cable pull 11, whereupon the drum brakes 4 are applied. A parking brake operation is executed after the operator has actuated an operating element 7. As this occurs, the output signals of the operating element 7 are sent to an electronic control unit (ECU) 6 associated with the electromechanical parking brake, said ECU correspondingly actuating the above-mentioned electromechanical adjusting unit 1. The above-mentioned electronic control unit 6 and the electronic control and regulation unit 5 associated with the service brake system communicate with each other by way of a data line 8 that is configured as a CAN connection.

FIG. 1 additionally represents a clutch pedal 14 with a clutch pedal travel sensor 18 that determines the clutch pedal travel. Further, the output signals of a gear information sensor 15 and of a sensor for inclination detection 16 determining the incline are sent to the control unit 6 associated with the parking brake.

Figure 2:
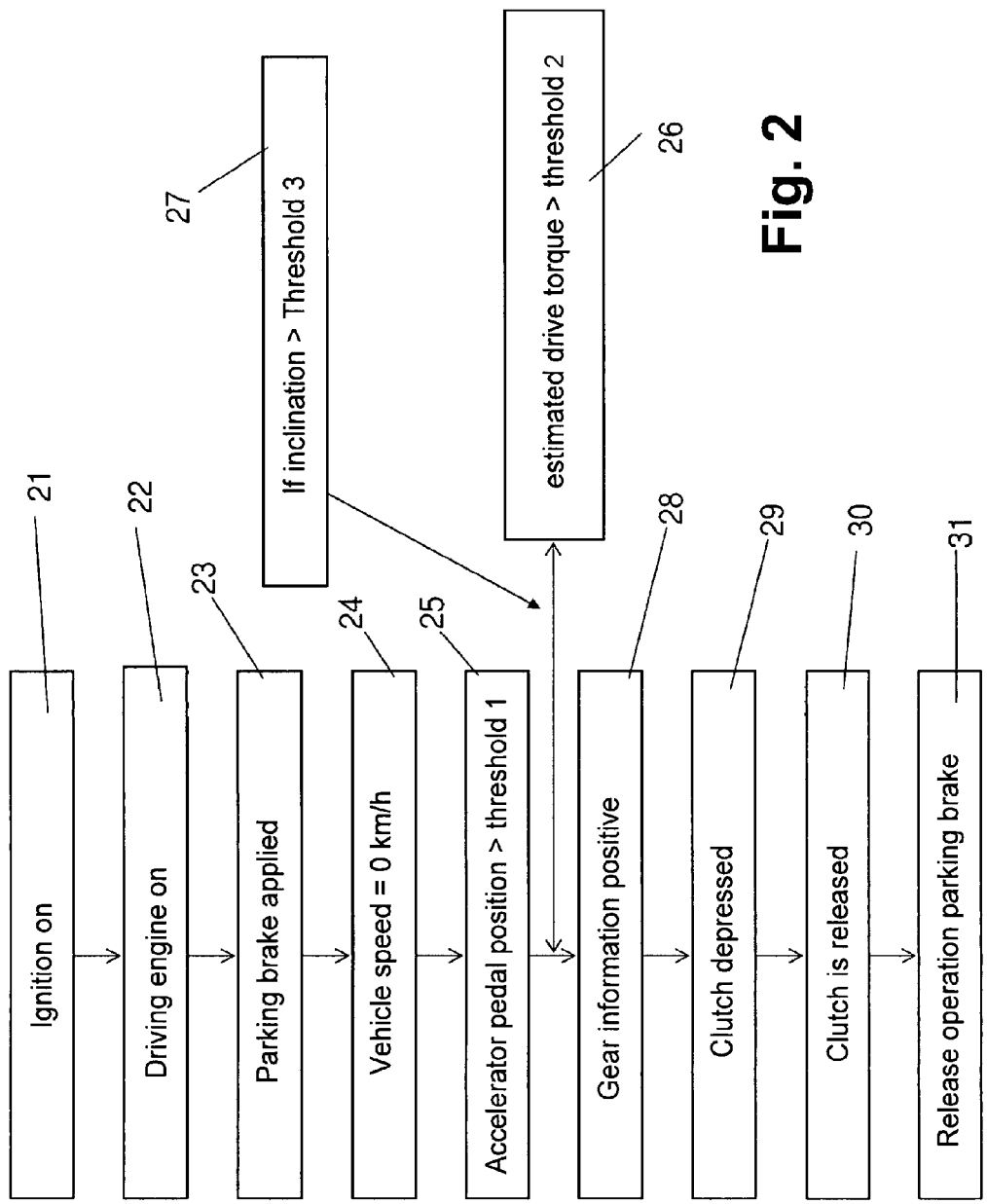
FIG. 2 shows a flow chart for detecting a starting maneuver and for the subsequent actuation for a release operation of the parking brake.

FIG. 2 illustrates a flow chart to detect a starting maneuver of the motor vehicle, and the control unit 6 associated with the parking brake actuates the adjusting unit 1 upon detection of a starting maneuver in the sense of a release operation of the parking brake. To detect a starting-maneuver, it is initially checked in process step 21 by way of a signal line (not shown) leading to the ignition lock (not shown) of the motor vehicle whether the ignition of the motor vehicle is activated. In case the ignition is activated, it is assumed under the proviso of the subsequent process steps that the motor vehicle shall be moved. For this purpose, an additional check is made in process step 22 whether the driving engine has adopted the operating mode. It is checked thereafter, whether the parking brake has been applied (process step 23). In the following process step 24 for detection of the starting maneuver, it is found out by means of the wheel rotational speed sensors 12, 13 mentioned with regard to FIG. 1, whether the motor vehicle is at standstill. Subsequently, the position of the accelerator or driving pedal is found out, which latter must be applied to an extent exceeding a predetermined first threshold (process step 25) in order to detect the starting maneuver. It is checked in the following process step 28 by means of the above-mentioned gear information sensor 15, whether the operator has selected a gear. Thereafter, the evaluation of the signals of the clutch pedal travel sensor 18 allows evaluating whether the operator has depressed the clutch pedal (process step 29). If the operator releases the clutch pedal 14 from the above-mentioned depressed position, a starting maneuver of the motor vehicle is detected in connection with the conditions referred to hereinabove, and the control unit 6 mentioned with respect to FIG. 1 actuates the adjusting unit 1 in the sense of a release operation of the parking brake (process steps (30, 31).

When the motor vehicle is placed on a slope having an incline that exceeds a predetermined, third threshold, the drive torque of the driving engine of the motor vehicle is estimated in addition between the process steps 25 and 28 described hereinabove. This estimated drive torque must be higher than a predetermined, second threshold (process steps 26, 27). The gradient of the slope is then found out by way of the sensor for inclination detection 16 mentioned with regard to FIG. 1, which determines the inclination of the motor vehicle.

Figure 3:
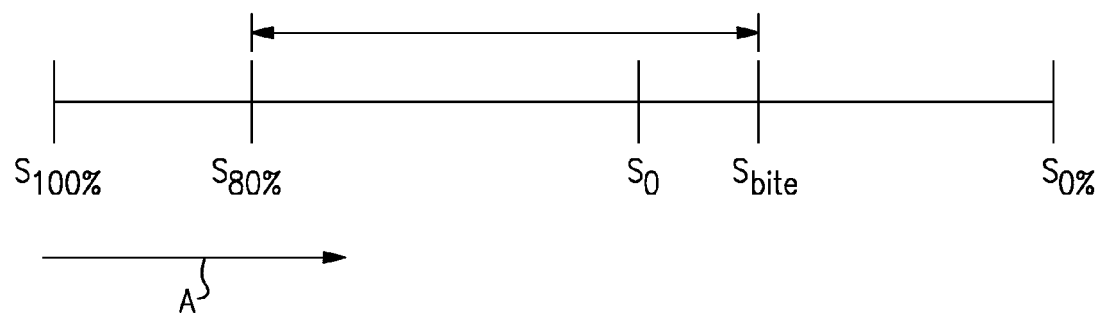
FIG. 3 shows a diagram schematically illustrating the travel of a clutch pedal.

FIG. 3 shows a diagram representing the travel of the clutch pedal 14 in order to illustrate the method of the invention. The position on the left side in FIG. 3 referred to as $S_{100\%}$ represents the clutch pedal position, where the operator has fully depressed the clutch pedal 14. When the operator moves the clutch pedal 14 out of the fully depressed position $S_{100\%}$, the clutch pedal 14 moves in a direction indicated by arrow A and passes the clutch bite-point $S_{bite}$, where the engine torque of the driving engine is transmitted to the drive axle, and is finally led into the rest position $S_{0\%}$ where the operator has taken his foot from the clutch pedal 14. According to the method of the invention, the actuation for the release operation of the parking brake occurs when the clutch pedal 14 has reached a position $S_0$ ahead of the clutch bite-point $S_{bite}$. The position $S_0$ then lies in the range between a clutch pedal 14 depressed 80% and the clutch bite-point $S_{bite}$.

Various methods are known to determine the clutch bite-point $S_{bite}$. For example, it is possible, on the one hand, to determine by means of a suitable sensor the variation of the acceleration of the motor vehicle, which is characteristic of this position of the clutch pedal 14. Alternatively, the clutch bite-point $S_{bite}$ can likewise be found out indirectly by determining the ratio between the rotational speed of the driving engine and its torque, which also exhibits a significant change when the clutch pedal 14 passes the clutch bite-point $S_{bite}$. As the clutch bite-point $S_{bite}$ depends on the temperature and the wear of the clutch, it is suitable to acquire the clutch bite-point $S_{bite}$ on a regular basis. In particular, the acquisition can be carried out with each starting maneuver.

The above-mentioned position $S_0$ before the clutch bite-point $S_{bite}$, which is significant for the release operation of the parking brake, is variable and determined depending on the start situation. The determination of the position $S_0$ is explained in more detail by way of FIG. 4. Initially, the inclination of the motor vehicle is found out in process step 33 with the help of the sensor for inclination detection 16 as mentioned hereinabove. Further, the actuating speed $V_{clutch}$ of the clutch pedal 14 is determined by means of the clutch pedal travel sensor 18, while the driving direction of the motor vehicle is determined using the above-mentioned gear information sensor 15 (process steps 34, 34). To determine the driving direction, the gear information sensor 15 is used to favorably detect whether the operator has switched into forward or rearward gear.

When driving forward, the position $S_0$ can be chosen to be farther remote in relation to the clutch bite-point $S_{bite}$ than when driving rearward, because this is the normal and usual driving direction.

Depending on the incline and the driving direction of the motor vehicle, release of the parking brake as early as possible is desirable e.g. in the case of 'downhill' and 'forward' in order to counteract the operator's feeling of being held on to. This implies that the position $S_0$ is chosen to be far away in relation to the clutch bite-point $S_{bite}$. However, if it is desired to drive uphill, the motor vehicle must be prevented from inadvertently rolling backward in opposition to the desired driving direction. This means that in this situation the parking brake is only allowed to be released when the clutch bite-point $S_{bite}$ is reached. In this case, the position $S_0$ is roughly congruent with the position of the clutch bite-point $S_{bite}$.

When the driver very slowly releases the clutch pedal 14 from the fully depressed position $S_{100\%}$, the position $S_0$ will also be roughly congruent with the position of the clutch bite-point $S_{bite}$. If, however, the driver releases the clutch pedal 14 very quickly, the clutch bite-point $S_{bite}$ is known to be reached within a very short time. Based on this knowledge and in order that the starting maneuver can be rendered as comfortable as possible, the position $S_0$ is adapted also in relation to this parameter.

As the adjusting unit 1 is always adjusting the maximum possible brake application force, the method at issue also provides that, upon detection of a starting maneuver, the brake application force is reduced to an inclination-responsive holding force already before the release operation of the parking brake is performed, in order to accelerate a release operation of the parking brake upon detection of a starting maneuver of the motor vehicle, and to render it as comfortable as possible. Thus, the parking brake is 'pre-released'. For this purpose, the electronic control unit 6 described by way of FIG. 1 actuates the adjusting unit 1 in such a manner that an inclination-responsive holding force is adjusted. This holding force is found out by means of the sensor for inclination detection 16. The inclination-responsive holding force is adjusted after the operator has fully depressed the clutch pedal 14 and has selected a gear. This fact is again found out by means of the clutch pedal travel sensor 18 and the gear information sensor 15. After the inclination-responsive holding force has been adjusted, the parking brake is released according to the method described hereinabove, provided that the operator continues the starting maneuver and moves the clutch pedal 14 to adopt the position $S_{0\%}$ as described hereinabove.

Should the above-mentioned inclination-responsive holding force have been adjusted erroneously, or should it be insufficient to hold the motor vehicle due to other marginal conditions, and should the motor vehicle start to move unwanted in opposition to the desired driving direction, the adjusting unit 1 is actuated to the effect of increasing the brake application force. Preferably, the maximum possible brake application force is adjusted again. The condition of rolling back in opposition to the desired driving direction is detected in this case with the aid of the signals of the gear information sensor 15, which provides information about the desired driving direction, as well as with the aid of the wheel rotational speed sensors 12, 13. However, the detection whether the motor vehicle rolls back in opposition to the driving direction desired by the operator is possible only if the wheel rotational speed sensors 12, 13 detect the direction of rotation of the wheels of the motor vehicle in addition to detecting the wheel rotational speed. If this is not the case, the adjusting unit 1 is actuated to the end of increasing the brake application force in the event of a rotation of the wheels of the motor vehicle as detected by the wheel rotational speed sensors 12, 13, i.e. when the motor vehicle is rolling, unless a command of full release of the parking brake was issued beforehand.

The invention claimed is:

1. A method for operating an hydraulic brake system including an electromechanically operable parking brake for a motor vehicle with a driving engine furnished with a mechanical gear box composed of an operating element, an electronic control and regulation unit associated with a service brake system which receives wheel rotational speed values from wheel rotational speed sensors, at least one unit comprising an electronic control unit associated with the electromechanically operated parking brake for generating a parking brake application force, and brake devices on at least one axle being lockable by the at least one unit, the method comprising:
   sensing a release operation of a parking brake to detect a starting maneuver of the motor vehicle;
   estimating a drive torque of the driving engine; and
   actuating the at least one unit after detection of the starting maneuver of the motor vehicle, wherein the electronic control and regulation unit actuates the at least one unit in order to reduce a parking brake application force to an inclination-responsive holding force when the starting maneuver is detected and before the release operation of the parking brake is performed, wherein a clutch pedal travel sensor detects a position of a clutch pedal of the motor vehicle, and actuation of the release operation occurs when the clutch pedal has reached a position ahead of a clutch bite-point and an estimated driving torque of the driving engine exceeds a threshold value, wherein an actuating speed of the clutch pedal is detected using the clutch pedal travel sensor, and the electronic control and regulation unit associated with the service brake system and the at least one unit comprising the electronic control unit associated with the electromechanically operable parking brake of the hydraulic brake system communicate with each other by a data line.

2. A method according to claim 1, wherein the inclination-responsive holding force is detected by a sensor for inclination detection.

3. A method according to claim 1, wherein the electronic control and regulation unit actuates the unit for increasing the parking brake application force when the inclination-responsive holding force is below a force sufficient to hold the motor vehicle in position.

4. A method according to claim 3, wherein the unit is actuated such that a maximum possible brake application force is generated.

5. A method according to claim 3, wherein wheel rotational speed sensors are employed to check whether a value of the inclination-responsive holding force is equal or above a force sufficient to hold the motor vehicle in position.

6. A method according to claim 1, wherein the position of the clutch pedal is set dependent on an incline, an actuating speed of the clutch pedal as detected by the clutch pedal travel sensor, and a driving direction of the motor vehicle as desired by the driver.

7. A method according to claim 1, wherein a sensor for inclination detection detects an incline.

8. A method according to claim 1, wherein a driving direction of the motor vehicle desired by the operator is determined utilizing a gear information sensor.

9. The method as recited in claim 1, wherein the threshold value has a first value when the vehicle is standing still and a second value when the motor vehicle is detected to be on a slope, and the second value is greater than the first value.

10. The method according to claim 1, wherein the data line is configured as a CAN connection.

11. The method according to claim 1, wherein the hydraulic brake system including the electromechanically operable parking brake and the service brake system are separate braking systems.

12. A method for operating an hydraulic brake system including an electromechanically operable parking brake for a motor vehicle with a driving engine furnished with a mechanical gear box, composed of an operating element, an electronic control and regulation unit associated with a service brake system which receives wheel rotational speed values from wheel rotational speed sensors, at least one unit comprising an electronic control unit associated with the electromechanical parking brake for generating a parking brake application force, and brake devices on at least one axle being lockable by the unit, the method comprising:
   sensing a release operation of a parking brake to detect a starting maneuver of the motor vehicle;
   estimating a driving torque of the driving engine; and
   actuating the unit after detection of the starting maneuver of the motor vehicle, wherein the electronic control and regulation unit actuates the unit in order to reduce a brake application force from a first brake application force level to an inclination-responsive holding force level that is less than the first brake application force level when the starting maneuver is detected responsive to a sensed movement of a clutch pedal of the motor vehicle, and the estimated driving torque exceeds a threshold value,
   wherein a clutch pedal travel sensor detects a position of the clutch pedal of the motor vehicle, and actuation of the release operation occurs when the clutch pedal has reached a position ahead of a clutch bite-point, and the electronic control and regulation unit associated with the service brake system and the at least one unit comprising the electronic control unit associated with the electromechanically operable parking brake of the hydraulic brake system communicate with each other by a data line.

13. The method as recited in claim 12, wherein the inclination-responsive holding force level is implemented before the release operation of the parking brake is performed.

14. The method as recited in claim 12, wherein the threshold value has a first value when the vehicle is standing still and a second value when the motor vehicle is detected to be on a slope, and the second value is greater than the first value.

15. The method according to claim 12, wherein the data line is configured as a CAN connection.

16. The method according to claim 12, wherein the hydraulic brake system including the electromechanically operable parking brake and the service brake system are separate braking systems.

* * * * *